Apr. 17, 1923. 1,452,261
W. E. WARNER
COOKING AND WASH UTENSIL
Filed Sept. 7, 1921 2 Sheets-Sheet 1
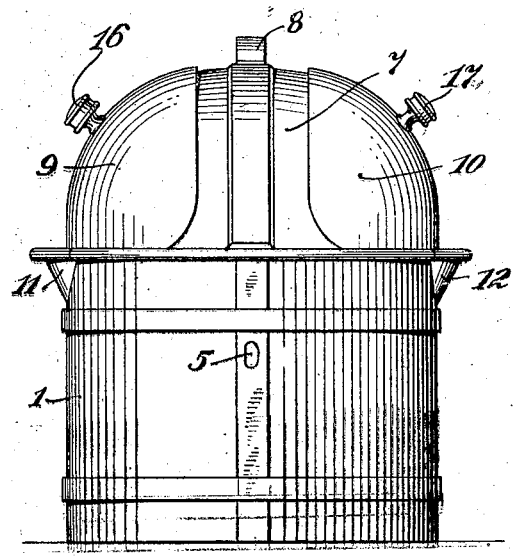
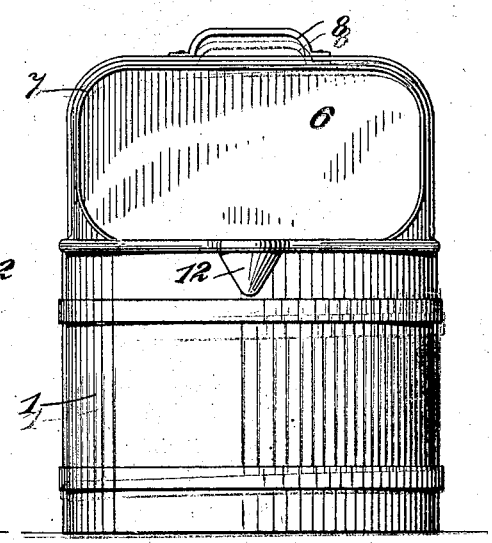
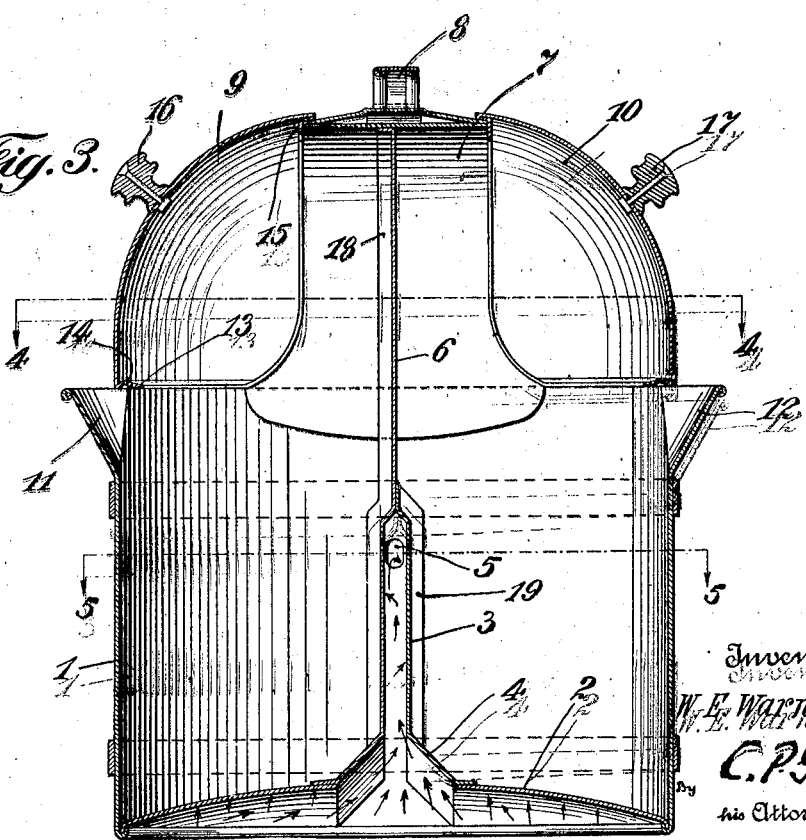

Apr. 17, 1923.　　　　　W. E. WARNER　　　　　1,452,261
COOKING AND WASH UTENSIL
Filed Sept. 7, 1921　　　　2 Sheets-Sheet 2

Inventor
W. E. Warner
By C. P. Goepel
his Attorneys

Patented Apr. 17, 1923.

1,452,261

UNITED STATES PATENT OFFICE.

WILLIAM E. WARNER, OF LINDEN, NEW JERSEY.

COOKING AND WASH UTENSIL.

Application filed September 7, 1921. Serial No. 499,085.

*To all whom it may concern:*

Be it known that I, WILLIAM E. WARNER, a citizen of the United States, and resident of Linden, county of Union, and State of New Jersey, have invented certain new and useful Improvements in Cooking and Wash Utensils, of which the following is a specification.

The present invention relates to improvements in cooking and wash utensils and has for an object to provide for the thorough heating of the contents of the receptacle not only through the action of heat applied from a burner beneath the bottom of the utensil but also through the action of heat circulated through a central portion of the receptacle and having outlets at the sides thereof by which the contents will be more quickly and effectively heated.

Another object of the invention consists in the provision of a cooking utensil in which the receptacle is divided into two or more compartments adapted to receive vegetables or other food stuffs to be cooked for the purpose of simultaneously preparing the same and in providing each compartment with a separate cover for giving access to the interior thereof and with individual spouts by which the liquid covering the vegetables may be decanted, the construction being such as to prevent liquid from one compartment from spilling over or getting into an adjoining compartment when the utensil is tilted.

The invention contemplates the provision of a simple and inexpensively constructed utensil for use in either cooking food stuffs or as a wash boiler or analogous device in which the heating of the interior of the utensil will be confined not merely to its lower portion but will extend upwardly to a desirable height from the bottom thereof sufficient to cause the heat to rapidly permeate the entire area of the utensil.

With the above and other objects in view, the invention consists in the improved form, construction and relative arrangement of the several parts as will be more fully described, illustrated in the accompanying drawings and subsequently incorporated in the subjoined claims.

In the drawings wherein I have illustrated one practical and satisfactory embodiment of the invention, and in which similar reference characters designate corresponding parts throughout the several views:

Figure 1 is a side elevation of an improved cooking utensil constructed according to the present invention;

Figure 2 is a similar view taken at right angles to Figure 1 with one of the covers removed;

Figure 3 is a vertical sectional view shown on an enlarged scale;

Figure 4:
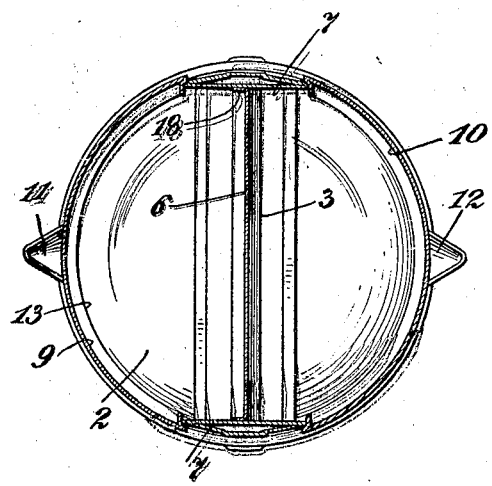
Figure 4 is a horizontal section taken on the line 4—4 in Figure 3.
Figure 5:
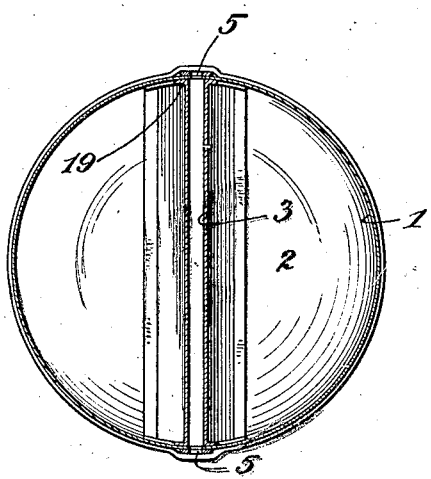
Figure 5 is a similar view taken on the line 5—5 also in Figure 3.

Referring more particularly to the drawings and for the present to Figures 1 to 5 inclusive, 1 designates a container body or receptacle which will usually be made of a cylindrical construction open at its top and having a pressed up bottom 2, of a concavo convex construction with its concave face presented downward to the flame of the burner.

A double walled partition 3 is made to extend diametrically across the cylindrical receptacle 1 and to have downwardly and outwardly flaring end walls 4 which are fitted about a central opening made across the bottom 2 as indicated in Figure 3. The connection of the bottom 2 with the receptacle 1 and the connection between the inclined walls 4 and the bottom 2 may be made in any desired manner. Outlets 5 are provided in the cylindrical wall of the receptacle 1 at points thereon which will set up a communication between the interior of the double walled partition and the outside atmosphere, these outlet ports 5 lying preferably at the upper portion of the space within the partition. The partition is closed at its upper end beneath the mouth of the receptacle and a single walled partition 6 forms an extension or prolongation of the double walled partition 3. This latter extension partition projects for a suitable distance upwardly beyond the mouth of the receptacle body 1 and is joined centrally with a semi-circular hood 7 which is attached at its opposite ends to diametrically opposite portions of the outer edge of the container body. A handle 8 is made with or secured to the hood 7 for the purpose of lifting the utensil, and cover plates 9 and 10 are used to engage with opposite edges of the hood 7 and the receptacle 1. The covers 9 and 10 are intended to wholly close the space above the two compartments provided by the partition 3 and its extension 6 to avoid the escape of the heat and vapor and such covers are formed on sections of a sphere to enclose the correspondingly shaped spaces which provide the mouths of the compartments into and out of which the food stuffs are introduced and removed.

The compartments are provided with spouts 11 and 12 preferably arranged at substantially right angles to the plane of the partition whereby the decanting of the contents through the spouts may take place in such wise that the partition 3 and its extension 6 will avoid any of the liquid from an adjoining compartment from spilling over or getting into a compartment at a lower level occasioned by the tilting of the receptacle to pour off its contents. The spouts 11 and 12 may be pressed out of the material of the walls of the receptacle body or they may be made separately and attached thereto. The cover plates will be preferably provided with inwardly projecting flanges 13 of suitable width to extend inwardly of the rim of the receptacle and further being formed with grooves 14 to receive the rim or upper edge of the receptacle body whereby to center the covers properly in place, form a tight joint and prevent the cover from sliding off the receptacle. In like manner the portions of the cover plates which engage with the hood 7 are overturned inwardly upon themselves and provided with vertically disposed flanges 15 which lie against the edge portions of the hood and form abutments or stops and incidentally, tight joints with the hood to prevent the escape of the steam and vapor. The hood 7 is preferably made of a double walled construction although this is not necessary. Appropriate handles 16 and 17 are carried by the covers 9 and 10 for ease in lifting and replacing them.

As shown more particularly in Figures 3 and 4, the partition extension 6 is made with lateral flanges 18 which lie against portions of the hood 7 and inner wall of the receptacle 1 and may be secured thereto in any desired manner which will preferably resist the heat to which a utensil of this character is usually subjected.

In like manner the double walled partition 3 is also with advantage provided with flanges 19 to fit against the interior of the cylindrical wall of the receptacle body 1 and to be secured thereto in any desired manner. Of course, it is to be understood that the partition and its extension may be secured in the utensil and in the hood 7 in any other way.

In the above device the covers 9 and 10 are removed and water poured separately into the two compartments at opposite sides of the partition 3. Suitable water is used to cover the particular vegetables to be cooked which later are introduced through openings at the opposite side of the hood 7. The covers 9 and 10 are replaced and the device lifted by the handle 8 and placed over a burner of a gas stove or other suitable heating source. The path taken by the products of combustion and currents of heated air induced by the draft of the burner is as indicated by the arrows in Figure 3. This course of the products is insured initially by the concave bottom 2 which deflects the heat towards the central opening and against the inclined walls 4. These latter walls 4 cause the currents to ascend into the base of the double walled receptacle 3. The walls are separated sufficiently to provide an ample space for receiving quantities of products of combustion and currents of heated air induced by the draft of the burner and the heated air, which, circulating in contact with the walls, will transmit heat to the interior of the compartments on opposite side thereof and serve to heat such compartments laterally as well as from the direct heat upon the bottom 2. The products of combustion and currents of heated air induced by the draft of the burner will circulate out through the ports 5 into the atmosphere and will provide for a constant interchange of the products of combustion and currents of heated air induced by the draft of the burner through the double walled partition. This action of the heat is felt quickly through the water in which the food stuffs are immersed and a rapid and thorough cooking of such food stuffs will result, the steam and vapors arising from water in the compartment being confined against escape by the close fitting of the covers 9 and 10. After a suitable time has elapsed for the proper cooking of the food stuffs, for instance in one compartment, the cover of that compartment may be removed and the water poured off through its respective spout by tilting the receptacle in one direction. During this operation the water in the adjoining receptacle will flow upwardly and its level will assume a diagonal line with one edge moving upwardly along the partition extension 6 and within side portions of the hood 7 lying within such partition.

Thus the partition extension and the sides of the hood will form a pocket to receive this overflow of liquid and prevent it from escaping over the edge of the receptacle or into the companion compartment. The cooked food stuffs are thereupon removed from the compartment after thus decanting the water and after replacing sufficient amount of water in the compartment to prevent destruction to the bottom thereof, the utensil may be returned to the burner or fire and the cooking of the material in the opposite compartment continued until properly completed.

Figure 6:
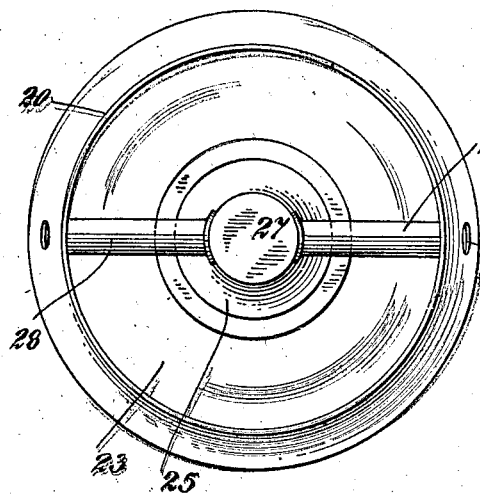
Figure 6 is a plan view of a wash boiler constructed according to the present invention.
Figure 7:
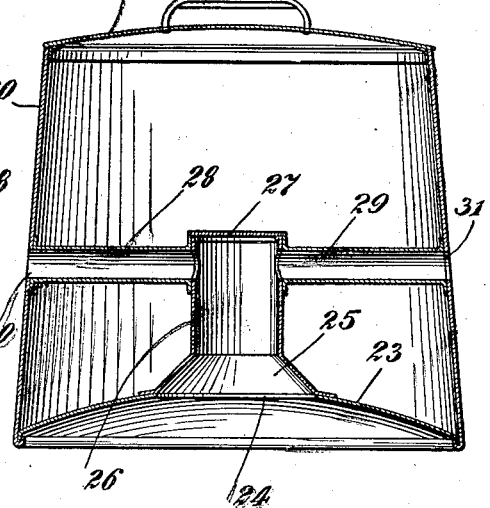
Figure 7 is a vertical sectional view therethrough.

Referring more particularly to Figures 6 and 7, the invention is herein shown in connection with a wash boiler in which 20 indicates the boiler or receptacle to receive a quantity of clothes or the like articles which are immersed in water held in the boiler at a suitable level. The cover is indicated at 21 and has a handle 22. In this instance the concavo-convex bottom 23 is provided with a central opening 24 which is substantially circular and which communicates with the lower circular end of a flaring frusto-conical funnel section 25. A cylindrical shell 26 rises upwardly from the upper portion of the funnel 25 and is closed at its upper end by a cap 27. The upper end of the device is shown at a substantially central point within the boiler 20 but it may be extended upwardly or carried downwardly to meet the various conditions.

A pair of lateral tubes 28 and 29 extend from the cylindrical shell 26 to the wall of the boiler 20 at substantially diametrically opposite points and communicates with the atmosphere through discharge ports 30 and 31. At their inner ends the tubes communicate with the interior of the shell 26 preferably, at its upper portion or just beneath the cap 27.

In the use of this device the bottom 23 being placed over a gas burner or heating source of any description will receive and direct the heating currents to the central opening 24 through which the same will ascend into the burner 25 and be guided thereby up within the cylindrical shell 26 which forms a heating chamber at the sides of the water in a somewhat similar manner to the heating chamber provided between the double walls of the partition 3 previously referred to.

In the case of the wash boiler, the central heating chamber is comprised within a cylindrical space while in the case of the cooking utensil, this chamber traverses the receptacle from side to side. The heat radiates through the water from the cylindrical shell 26 and is dispersed in a substantially horizontal direction while the heat rising from the bottom 23 ascends at substantially right angles through the heat thus radiated from the shell 26. The products of combustion and currents of heated air induced by the draft of the burner escape through the tubes 28 and 29 and through the ports 30 and 31 to the atmosphere in a similar manner to the escape of the products to the ports 5 as previously explained. The discharge of products of combustion and currents of heated air induced by the draft of the burner through the ports into the atmosphere at this point will cause a suction through the heating chamber and ports in both cases and will set up a draft such as will cause the rapid exchange of fresh products of combustion and currents of heated air induced by the draft of the burner through the heating chamber.

While I have herein shown and described the preferred construction and arrangement of the several elements, it will nevertheless be understood that the device is susceptible of considerable modification in the form, proportion and relative arrangement of the several parts, and I accordingly reserve the privilege of adopting all such legitimate changes as may be fairly embodied within the spirit and scope of the invention as claimed.

I claim:

1. A utensil comprising a body having a concave bottom with an opening in its innermost portion, relatively deep tapering walls secured about the bottom opening, said body having an enclosed space therewithin connected at its base to the tapering walls and a plurality of outlets communicating with said space through the sides of the body, said plurality of outlets being widely spaced around the body, the enclosed space being of substantially the same width as the upper ends of the tapering walls.

2. A utensil comprising a container body, a hollow partition in the body opening through the base thereof and also through the sides of the body, an extension partition rising in continuation of the hollow partition and beyond the upper end of the body, a hood secured at its ends to the sides of the body and lying about the edge of the extension partition which is above the body, and flanged spherical covers fitting tightly against the edges of the hood and the rim of the body.

3. A utensil comprising a container body having a concave base with a relatively wide and elongated opening made in the innermost part thereof, diagonal walls leading from the sides of the opening and converging upwardly at sharp angles, a hollow partition in the body communicating at its base with the upper closely spaced ends of the diagonal walls, said hollow partition communicating at opposite ends with the outside atmosphere, an extension partition rising from the hollow partition and going beyond the container body, a hood extending about the protruding edge of the extension partition and forming pockets at the sides thereof, and independent covers cooperating with said body and the edges of said hood.

In testimony that I claim the foregoing as my invention, and I have signed my name hereunto.

WILLIAM E. WARNER.